US007343849B2

(12) United States Patent
Asaba

(10) Patent No.: US 7,343,849 B2
(45) Date of Patent: Mar. 18, 2008

(54) CYLINDER APPARATUS

(75) Inventor: Tsuyoshi Asaba, Abiko (JP)

(73) Assignee: SMC Kabushiki Kaisha, Tokyo (JP)

( * ) Notice: Subject to any disclaimer, the term of this patent is extended or adjusted under 35 U.S.C. 154(b) by 231 days.

(21) Appl. No.: 11/217,387

(22) Filed: Sep. 2, 2005

(65) Prior Publication Data

US 2006/0056984 A1 Mar. 16, 2006

(30) Foreign Application Priority Data

Sep. 13, 2004 (JP) ............................ 2004-264939

(51) Int. Cl.
*F15B 15/14* (2006.01)
*F16L 11/00* (2006.01)

(52) U.S. Cl. ...................................... 92/165 R; 92/166

(58) Field of Classification Search .............. 92/165 R, 92/166, 168
See application file for complete search history.

(56) References Cited

U.S. PATENT DOCUMENTS 1,575,185 A * 3/1926 Stenhouse ............... 92/165 PR
2,660,124 A * 11/1953 Porter ..................... 417/555.1
4,555,979 A * 12/1985 Cetnarowski ................ 92/166
5,113,746 A * 5/1992 Yuda ...................... 92/165 PR
5,305,683 A * 4/1994 Gosdowski et al. ...... 92/165 R
5,440,971 A * 8/1995 Yuda ...................... 92/165 PR
5,918,708 A * 7/1999 Yuda et al. .................. 188/67

FOREIGN PATENT DOCUMENTS

| | | | |
|---|---|---|---|
| DE | 41 11 202 | | 10/1992 |
| DE | 102 00 608 | | 8/2002 |
| JP | 9-303318 | | 11/1997 |
| JP | 09-303318 | | 11/1997 |
| JP | 09303318 | A * | 11/1997 |
| JP | 2000-299956 | | 10/2000 |
| JP | 2001-074005 | | 3/2001 |
| JP | 2002-168206 | | 6/2002 |

* cited by examiner

*Primary Examiner*—Thomas E. Lazo
(74) *Attorney, Agent, or Firm*—Paul A. Guss

(57) ABSTRACT

A piston, which is provided in a cylinder tube, is connected to a pair of guide rods by the aid of a plate. The guide rods are arranged displaceably in the axial direction along guide holes of the cylinder tube. The displacement of the piston is guided by the guide rods. The guide holes are communicated with the outside via a tube connected to an air hole. The air is sucked into and discharged from the guide holes via the tube in accordance with the reciprocating motion of the piston.

45 Claims, 3 Drawing Sheets

CYLINDER APPARATUS

BACKGROUND OF THE INVENTION

1. Field of the Invention

The present invention relates to a cylinder apparatus provided with a guide mechanism for guiding a displacement action of a piston in an axial direction.

2. Description of the Related Art

A cylinder apparatus has been hitherto used to transport and position a workpiece or as a driving mechanism for driving a variety of industrial machines. The cylinder apparatus is driven, for example, by pressure fluid. Various types of such cylinder apparatus are adopted depending on the environment of use in order to respond to the needs of the user.

The cylinder apparatus as described above is provided with a piston which is displaceable, for example, in the axial direction in a cylinder body. In this structure, a piston rod is connected to the piston. The piston rod is inserted into a cylinder chamber which is formed in the cylinder body, and a connecting member is connected to the end thereof. The piston rod is connected to a substantially central portion of the connecting member. A pair of guide shafts, which are separated from each other by a predetermined distance from the center of the connecting member, is connected substantially in parallel to the piston rod.

The guide shafts are inserted into guide holes formed in the cylinder body, which are supported displaceably in the axial direction. The piston is displaced in the axial direction by the pressure fluid supplied to the cylinder chamber, and thus the piston rod, which is connected to the piston, is displaced integrally with the connecting member. In this operation, the guide shafts, which are connected to the connecting member, are displaced integrally along the guide holes to guide the displacement of the piston in the axial direction (see, for example, Japanese Laid-Open Patent Publication No. 9-303318).

In the conventional technique according to Japanese Laid-Open Patent Publication No. 9-303318, a respiration hole, which makes communication between the inside and the outside of the guide hole, is formed for the guide hole into which the guide shaft is inserted. That is, the air contained in the guide hole is discharged to the outside, and thus the air does not remain in the guide hole. Accordingly, there is no displacement resistance when the guide shaft is inserted into the guide hole. It is possible to smoothly displace the guide shaft.

However, the cylinder apparatus as described above is sometimes used in an environment where the cylinder apparatus is splashed with liquid such as water depending on different uses. In such a situation, the liquid may undesirably enter inside of the cylinder body through the respiration hole.

If liquid such as water enters inside of the cylinder body as described above, then the lubricant, which is applied to the sliding portion between the guide shaft and the guide hole, flows out due to the liquid, and the lubricant is washed out. Consequently, the lubrication performance of the guide shaft is deteriorated.

Further, if liquid such as water enters inside of the cylinder body, the liquid stays in the cylinder body. In this case, sanitary problems may undesirably occur.

SUMMARY OF THE INVENTION

A general object of the present invention is to provide a cylinder apparatus which is capable of avoiding liquid from entering into a cylinder tube reliably and conveniently even when the cylinder apparatus is used in an environment in which the water exists.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
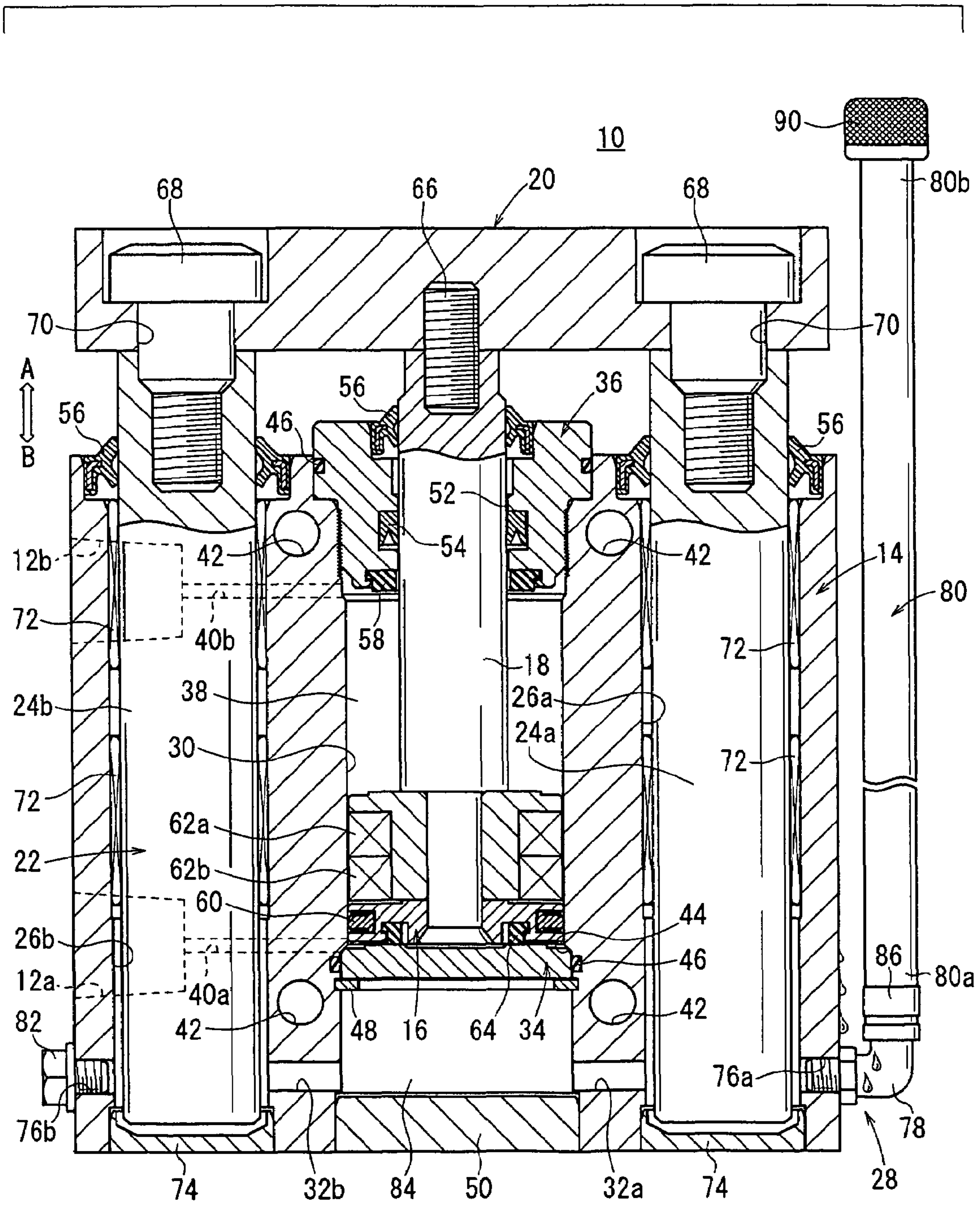
FIG. 1 is a vertical sectional view illustrating a cylinder apparatus according to an embodiment of the present invention.
Figure 2:
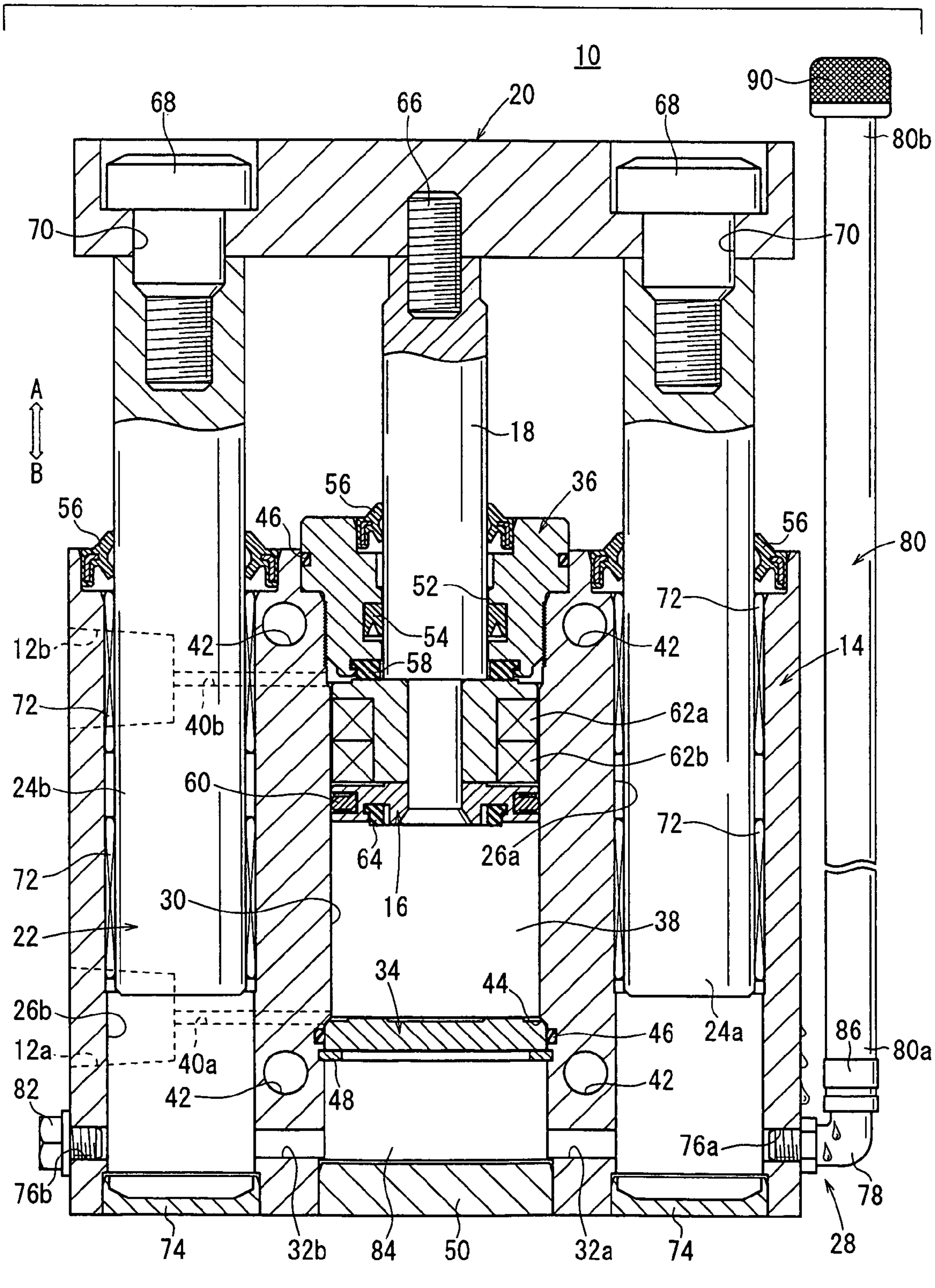
FIG. 2 is a vertical sectional view illustrating a state in which a piston of the cylinder apparatus shown in FIG. 1 is displaced toward a rod cover.

With reference to FIGS. 1 and 2, reference numeral 10 indicates a cylinder apparatus according to an embodiment of the present invention.

The cylinder apparatus 10 comprises a cylinder tube 14 which is formed to have a substantially rectangular cross section and which is formed with a pair of pressure fluid displaceably in the axial direction in the cylinder tube 14, a piston rod 18 which is connected to the portion disposed on one end surface side of the piston 16, a plate (connecting member) 20 which is connected to the end of the piston rod 18, a guide mechanism 22 which guides the displacement of the piston 16 in the axial direction, and an air vent mechanism 28 which sucks and discharges the air into and from guide holes 26*a*, 26*b* into which guide rods 24*a*, 24*b* of the guide mechanism 22 are inserted.

A through-hole 30, which penetrates in the axial direction, is formed at a substantially central portion of the cylinder tube 14. The pair of guide holes 26*a*, 26*b* is formed substantially in parallel to the through-hole 30 while being separated from the through-hole 30 by predetermined distances. The guide holes 26*a*, 26*b* and the through-hole 30 are communicated with each other via a pair of communication passages 32*a*, 32*b* which are substantially perpendicular to the axis of the through-hole 30.

One end of the through-hole 30 is closed by a head cover 34, and the other end thereof is closed by a rod cover 36. That is, the through-hole 30, which is closed by the head cover 34 and the rod cover 36, functions as a cylinder chamber 38 in which the piston 16 is provided displaceably.

The pressure fluid inlet/outlet ports 12*a*, 12*b*, which are open to the outside via passages 40*a*, 40*b* respectively, are connected to one end side and the other end side of the through-hole 30. The pressure fluid inlet/outlet ports 12*a*, 12*b* are connected to an unillustrated pressure fluid supply source. The pressure fluid (for example, compressed air), which is supplied from the unillustrated pressure fluid supply source, is introduced into the cylinder chamber 38 via the pressure fluid inlet/outlet ports 12*a*, 12*b* and the passages 40*a*, 40*b*.

A plurality of (for example, four) attachment holes 42, which are separated from the through-hole 30 as their center, are formed for the cylinder tube 14. The cylinder apparatus 10 including the cylinder tube 14 can be fixed to the floor surface or the like by means of bolts or the like by the attachment holes 42.

The head cover 34 is formed by a disk-shaped plate with its one end surface being engaged with a stepped section 44 formed in the through-hole 30. Accordingly, the displacement toward the cylinder chamber 38 (in the direction of the arrow A) is limited. A seal member 46 is installed to an annular groove on the inner circumferential surface of the through-hole 30 at a position opposed to the outer circumferential surface of the head cover 34. The seal member 46 abuts against the outer circumferential surface of the head cover 34, and thus air tightness in the cylinder chamber 38 is reliably retained.

An annular groove is formed on the inner circumferential surface of the through-hole 30 on the other end surface side of the head cover 34. A fastening member 48 having a substantially C-shaped cross section, which has resilient force to urge radially outwardly, is installed to the annular groove.

That is, the displacement of the head cover 34 is limited toward the cylinder chamber 38 (in the direction of the arrow A) by the stepped section 44 in the through-hole 30, and then the fastening member 48 is installed to the annular groove so that the displacement is also limited thereby in the direction (direction of the arrow B) to make separation from the cylinder chamber 38 by the fastening member 48 which protrudes radially inwardly from the inner circumferential surface of the through-hole 30. Therefore, the head cover 34 is fixed by limiting the displacement in the axial direction (directions of the arrows A and B) in the through-hole 30 by means of the stepped section 44 and the fastening member 48.

A cover member 50, which closes the through-hole 30, is fitted at a position at the end of the cylinder tube 14 in the through-hole 30. The communication passages 32*a*, 32*b* are formed at the positions between the cover member 50 and the head cover 34.

The rod cover 36 is formed to have a substantially columnar shape, which is screwed on the open other end side of the through-hole 30. A rod hole 52, into which the piston rod 18 is inserted, is formed at a substantially central portion of the rod cover 36. A rod packing 54 for retaining air tightness between the rod hole 52 and the piston rod 18 and a scraper 56 for removing dust or the like adhered to the outer circumferential surface of the piston rod 18 are installed to annular grooves on the inner circumferential surface of the rod hole 52 respectively.

A buffer member 58 composed of a resin material is installed to the end surface of the rod cover 36 so that the buffer member 58 is opposed to the piston 16. When the piston 16 is displaced to abut against the rod cover 36, the impact is buffered by the buffer member 58.

Further, the seal member 46 is installed to the annular groove on the outer circumferential surface of the rod cover 36. The seal member 46 makes contact with the inner circumferential surface of the through-hole 30, and thus air tightness is reliably retained in the cylinder chamber 38.

The piston 16 is provided in the cylinder chamber 38. Those provided on the outer circumferential surface of the piston 16 are an annular piston packing 60 and a pair of magnetic members 62*a*, 62*b* (for example, permanent magnets) which are separated from the piston packing 60 by predetermined distances.

That is, the piston 16 is displaced in the axial direction (directions of the arrows A and B) while allowing the piston packing 60 to make contact with the inner circumferential surface of the cylinder chamber 38, and thus the piston 16 can be displaced while retaining air tightness in the cylinder chamber 38 which is divided by the piston 16.

A detection sensor (not shown), which is capable of detecting the magnetism, is provided outside the cylinder tube 14, and the magnetism of the magnetic members 62*a*, 62*b* installed to the piston 16 is detected by the detection sensor. Accordingly, the detection sensor can be used to detect the displacement position of the piston 16 in the axial direction.

On the other hand, a buffer member 64 made of a resin material is installed to the end surface of the piston 16 on the side of the head cover 34 at a position opposed to the head cover 34. When the piston 16 is displaced to abut against the head cover 34, the impact is buffered by the buffer member 64.

The plate 20 is formed to have a substantially rectangular shape. The piston rod 18 is connected to a substantially central portion of the plate 20 by a screw member 66. The pair of guide rods 24*a*, 24*b* of the guide mechanism 22, which are disposed at substantially symmetrical positions from the center of the portion of connection of the piston rod 18, is connected to the plate 20 by connecting bolts 68. Bolt holes 70, which are formed in the plate 20, are formed so that each of the bolt holes 70 is recessed by a predetermined depth towards the guide rod 24*a*, 24*b* (in the direction of the arrow B) and each of the bolt holes 70 is diametrally expanded radially outwardly. Therefore, the heads of the connecting bolts 68 are appropriately accommodated. The heads of the connecting bolts 68 do not protrude from the end surface of the plate 20.

The guide mechanism 22 comprises the pair of guide rods 24*a*, 24*b* which are inserted into the guide holes 26*a*, 26*b* formed in the cylinder tube 14, annular bushes 72 which are arranged on the inner circumferential surfaces of the guide holes 26*a*, 26*b*, and the scrapers 56 which are installed to open portions disposed on one end side of the guide holes 26*a*, 26*b* and which remove dust or the like adhered to the outer circumferential surfaces of the guide rods 24*a*, 24*b*. Cover plates 74, each of which has a substantially U-shaped cross section, are installed to open portions disposed on the other end side of the guide holes 26*a*, 26*b*. The other ends of the guide holes 26*a*, 26*b* are closed by the cover plates 74.

The bushes 72, which are arranged for the guide holes 26*a*, 26*b*, are provided to abut against the outer circumferential surfaces of the guide rods 24*a*, 24*b*. Therefore, the bushes 72 support the displacement of the guide rods 24*a*, 24*b* in the axial direction reliably and highly accurately. A pair of the bushes 72, which are separated from each other by a predetermined distance in the axial direction of each of the guide holes 26*a*, 26*b*, are provided respectively.

The air vent mechanism 28 comprises a pair of air holes (holes) 76*a*, 76*b* which are formed for the cylinder tube 14 and which make communication between the outside of the cylinder tube 14 and the guide holes 26*a*, 26*b*, a joint member 78 which is connected to one air hole 76*a*, a tube (intake/discharge tube) 80 which is connected to the joint member 78, and a closing plug (closing member) 82 which closes the other air hole 76*b*.

The air holes 76*a*, 76*b* are communicated with the guide holes 26*a*, 26*b* respectively, and they are communicated via the pair of communication passages 32_a_, 32_b_ with a communication chamber 84 which is closed by the cover member 50 and the head cover 34. That is, one air hole 76_a_ and the other air hole 76_b_ are communicated with each other via the communication passages 32_a_, 32_b_ and the communication chamber 84. The air holes 76_a_, 76_b_ are arranged at the positions opposed to the communication passages 32_a_, 32_b_ of the cylinder tube 14 respectively.

Figure 3:
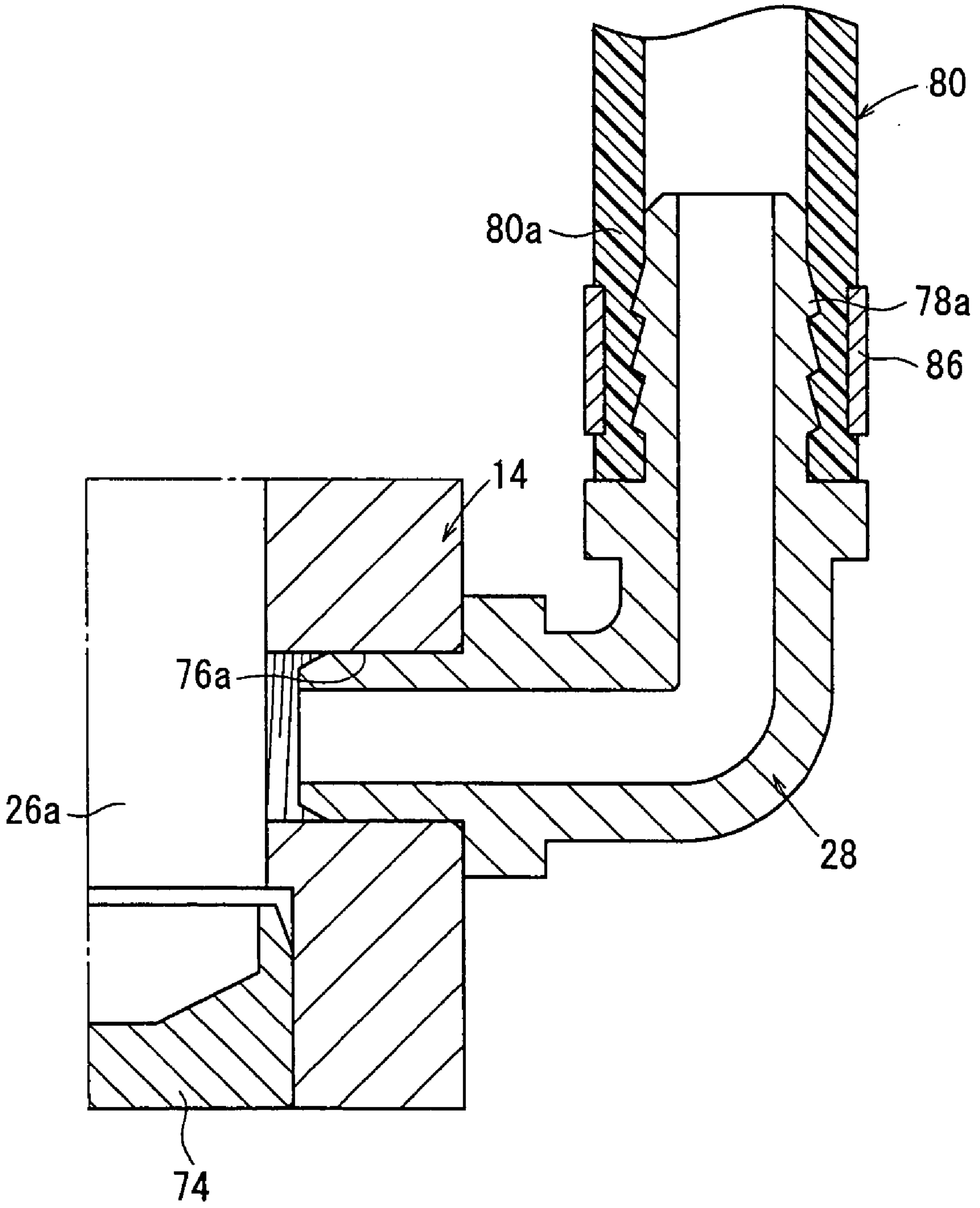
FIG. 3 is a magnified vertical sectional view illustrating those disposed in the vicinity of an air vent mechanism shown in FIG. 2.

As shown in FIG. 3, one end of the joint member 78 having a substantially L-shaped cross section is screw-engaged with one air hole of the air holes 76_a_, 76_b_ (for example, air hole 76_a_), and the tube 80 is connected to the other end of the joint member 78. As shown in FIG. 3, a disengagement-preventive section (section for preventing any disengagement) 78_a_, which has a plurality of steps on the outer circumferential surface in the axial direction, is formed at the other end of the joint member 78. By installing the tube 80 by the disengagement-preventive section 78_a_, the tube 80 is prevented from being disengaged.

Air tightness is reliably retained at the inside of the joint member 78. Therefore, the fluid does not leak to the outside from the joint member 78, the connecting portion between the joint member 78 and the air hole 76_a_, and the connecting portion between the joint member 78 and the tube 80. The tube 80 is tightened and fixed by a tightening band 86 to the end of the joint member 78. The tube 80 is interposed by the tightening band 86 and the disengagement-preventive section 78_a_, and thus the tube 80 is more reliably prevented from disengagement.

On the other hand, as shown in FIGS. 1 and 2, the closing plug 82 is screwed with the other air hole 76_b_ to prevent the fluid contained in the guide holes 26_a_, 26_b_ from leaking to the outside via the other air hole 76_b_.

As described above, one of the air holes 76_a_, 76_b_ is in the state of being open to the atmospheric air of the outside via the tube 80 connected to the joint member 78, and the other is in the closed state in which the communication state is blocked between the guide holes 26_a_, 26_b_ and the outside by the closing plug 82.

One end 80_a_ of the tube 80 is connected to the joint member 78 by the tightening band 86. The other end 80_b_ of the tube 80 is arranged such that it is not splashed with liquid even when the cylinder apparatus 10 is installed in an environment in which liquid such as water exists. That is, if the other end 80_b_ of the tube 80 is arranged in an environment in which the liquid exists, the liquid may undesirably enter inside of the tube via the other end, because the other end 80_b_ of the tube 80 is open to the atmospheric air outside of the cylinder tube 14. Therefore, the other end 80_b_ of the tube 80 is designed to have a length such that the other end 80_b_ is not splashed with liquid.

In the foregoing description, the tube 80 is connected via the joint member 78 to one air hole 76_a_, and the other air hole 76_b_ is closed by the closing plug 82. However, there is no limitation thereto. One air hole 76_a_ may be closed by the closing plug 82, while the tube 80 may be connected to the other air hole 76_b_ via the joint member 78, depending on the situation of use of the cylinder apparatus 10.

The cylinder apparatus 10 according to the embodiment of the present invention is basically constructed as described above. Next, its operation, function, and effect will be explained.

An explanation will now be made about a case in which the cylinder apparatus 10 is installed in an environment in which liquid such as water exists.

At first, the length of the tube 80 to be connected to the air hole 76_a_ of the cylinder apparatus 10 is set based on the distance from the place at which the cylinder apparatus 10 is installed to the place at which liquid such as water is absent. Further, the joint member 78 is previously screwed with the air hole 76_a_ of the cylinder apparatus 10, and the tube 80, which has been set to have the desired length, is connected beforehand to the joint member 78 by the tightening band 86.

Subsequently, the cylinder apparatus 10 is installed in an environment in which the cylinder apparatus 10 is splashed with liquid such as water. In this situation, the cylinder apparatus 10 is arranged so that the other open end 80_b_ of the tube 80 is disposed outside the environment in which liquid such as water exists. In this arrangement, for example, a dust-removing mechanism 90 such as a filter having a mesh-shaped form is provided at the other end 80_b_ of the tube 80. Therefore, it is possible to avoid dust or the like contained in the atmospheric air from entering inside of the tube 80.

Accordingly, even when the cylinder apparatus 10 is used in an environment in which it is splashed with liquid such as water, then the air contained in the guide holes 26_a_, 26_b_ can be discharged via the tube 80, or the atmospheric air can be aspirated into the guide holes 26_a_, 26_b_, while the length of the tube 80 connected to the air hole 76_a_ of the cylinder apparatus 10 is set to be an arbitrary length depending on the environment of use. As a result, it is possible to avoid liquid existing outside the cylinder apparatus 10 from entering into the cylinder tube 14.

Next, an explanation will be made about the operation, function, and effect of the cylinder apparatus 10 installed as described above. The initial position is a state in which the piston 16 is displaced toward the head cover 34 (in the direction of the arrow B), and the plate 20 of the cylinder apparatus 10 is at a position disposed closely to the cylinder tube 14 (see FIG. 1).

At first, an explanation will be made about the operation in which the piston 16 is displaced from the initial position toward the rod cover 36 (in the direction of the arrow A).

The pressure fluid is supplied from the unillustrated pressure fluid supply source to one pressure fluid inlet/outlet port 12_a_ disposed on the side of the head cover 34. Accordingly, the pressure fluid is introduced via the passage 40_a_ into the cylinder chamber 38. In this situation, the other pressure fluid inlet/outlet port 12_b_ is in a state of being open to the atmospheric air. The piston 16 is displaced toward the rod cover 36 (in the direction of the arrow A) under the pressing action of the pressure fluid. The piston rod 18 and the plate 20, which are connected to the piston 16, are integrally displaced in the direction of the arrow A (see FIG. 2).

In this arrangement, the guide rods 24_a_, 24_b_, which are connected to the plate 20, are supported displaceably in the axial direction of the guide holes 26_a_, 26_b_. Therefore, the piston 16 and the piston rod 18 can be displaced reliably and highly accurately in the axial direction under the guiding action thereof.

The end surface of the piston 16 abuts against the buffer member 58 provided for the rod cover 36 under the displacement action thereof, and thus the displacement terminal end position is established.

In this operation, the guide rods 24_a_, 24_b_ are displaced in the direction (direction of the arrow A) to make separation from the cover plates 74 along the guide holes 26_a_, 26_b_. Therefore, a predetermined amount of the air is introduced from the air hole 76_a_ via the tube 80 into the guide holes 26_a_, 26_b_. In other words, negative pressure is generated in the guide holes 26_a_, 26_b_ in accordance with the displacement of the guide rods 24*a*, 24*b* in the direction to make separation from the cover plates 74. Therefore, the air is sucked into the guide holes 26*a*, 26*b* from the tube 80 communicated with the atmospheric air under the action of the negative pressure. In this situation, liquid such as water does not enter inside of the cylinder tube 14 via the tube 80, because the other end 80*b* of the tube 80 having the predetermined length is arranged outside the environment in which liquid such as water exists.

Contrary to the above, when the pressure fluid, which is supplied from the pressure fluid supply source (not shown), is supplied to the other pressure fluid inlet/outlet port 12*b* disposed on the side of the rod cover 36 under the switching action of an unillustrated directional control valve, the pressure fluid is introduced via the passage 40*b* into the cylinder chamber 38 disposed on the opposite side. In this situation, one pressure fluid inlet/outlet port 12*a* is in the state of being open to the atmospheric air.

The piston 16 is displaced toward the head cover 34 (in the direction of the arrow B) under the pressurizing action of the pressure fluid. The piston rod 18 and the plate 20, which are connected to the piston 16, are integrally displaced in the direction of the arrow B (see FIG. 1). In this arrangement, the guide rods 24*a*, 24*b*, which are connected to the plate 20, are supported displaceably in the axial direction of the guide holes 26*a*, 26*b*. Therefore, the piston 16 and the piston rod 18 can be displaced reliably and highly accurately in the axial direction under the guiding action thereof.

The end surface of the piston 16 abuts against the head cover 34 under the displacement action thereof. Accordingly, restoration is made to the initial position. In this operation, the impact is buffered upon abutment by the buffer member 64 provided on the end surface of the piston 16.

In this operation, the guide rods 24*a*, 24*b* are displaced toward the cover plates 74 (in the direction of the arrow B) along the guide holes 26*a*, 26*b*. Therefore, the air contained in the guide holes 26*a*, 26*b* is discharged from the air hole 76*a* via the tube 80 to the outside.

That is, the other end 80*b* of the tube 80 is arranged outside the environment in which liquid such as water exists. Therefore, when the piston 16 is displaced toward the rod cover 36 (in the direction of the arrow A), liquid such as water does not enter inside of the cylinder tube 14 from the air hole 76*a* via the tube 80. Contrary to the above, when the piston 16 is displaced toward the head cover 34 (in the direction of the arrow B), the air contained in the guide holes 26*a*, 26*b* is discharged by the guide rods 24*a*, 24*b* via the air hole 76*a* from the tube 80. Therefore, liquid such as water does not enter inside of the guide holes 26*a*, 26*b* from the air hole 76*a*.

As described above, in the embodiment of the present invention, the cylinder apparatus 10 is provided with the air holes 76*a*, 76*b* which make communication between the outside of the cylinder tube 14 and the guide holes 26*a*, 26*b* which are formed in the cylinder tube 14 and into which the guide rods 24*a*, 24*b* are inserted. One end 80*a* of the tube 80 having the predetermined length is connected to one air hole 76*a* by the joint member 78. When the cylinder apparatus 10 is used in an environment in which it is splashed with liquid such as water, the open other end 80*b* of the tube 80 is extended to a position at which liquid is absent and which is disposed outside the environment in which it is splashed with liquid such as water. Accordingly, it is possible to avoid liquid such as water from entering into the cylinder tube 14 via the air hole 76*a*. Thus, the cylinder apparatus 10 can be appropriately used even in an environment in which liquid such as water exists.

When the guide rods 24*a*, 24*b* are displaced in the axial direction, then the air contained in the guide holes 26*a*, 26*b* is discharged via the air hole 76*a* (76*b*), or the atmospheric air is sucked from the outside of the cylinder tube 14 into the guide holes 26*a*, 26*b* via the air hole 76*a* (76*b*). As described above, air is sucked and discharged via the tube 80 connected to the air hole 76*a* (76*b*). Therefore, liquid such as water, which exists outside the cylinder tube 14, does not enter inside of the cylinder tube 14.

Further, the air holes 76*a*, 76*b* are communicated with each other via the communication chamber 84 and the pair of communication passages 32*a*, 32*b* formed in the cylinder tube 14. Therefore, the joint member 78 and the tube 80 are connected to only one of the air holes 76*a*, 76*b* so as to be open to the atmospheric air, without using both of the air holes 76*a*, 76*b* provided for the cylinder tube 14. Accordingly, the air can be discharged from the pair of guide holes 26*a*, 26*b* by using the single air hole 76*a* in a concentrated manner. Similarly, the air can be sucked into the pair of guide holes 26*a*, 26*b* by using the single air hole 76*a* in a concentrated manner as well.

Furthermore, the dust-removing mechanism 90 (for example, a filter) is provided at the open other end 80*b* of the tube 80. Accordingly, it is possible to avoid dust or the like contained in the atmospheric air from entering into the cylinder tube 14 via the other end 80*b* of the tube 80.

Although certain preferred embodiments of the present invention have been shown and described in detail, it should be understood that various changes and modifications may be made therein without departing from the scope of the appended claims.

What is claimed is:

1. A cylinder apparatus comprising:

a guide mechanism for guiding displacement in an axial direction of a piston provided in a cylinder tube, said guide mechanism including a guide hole formed in said cylinder tube, and a guide rod provided insertably into said guide hole to make displacement integrally with said piston;

a pair of holes which makes communication between said guide hole and outside of said cylinder tube and which discharges air from inside of said guide hole or which sucks said air from said outside of said cylinder tube into said guide hole in accordance with forward and backward movement of said guide rod; and an intake/discharge tube which is connected to said hole and through which said air flows to be sucked into or discharged from said guide hole via said hole, wherein a pair of said guide holes is provided substantially in parallel to a cylinder chamber in which said piston is arranged, said cylinder chamber being positioned at the center between said guide holes, and one guide hole and the other guide hole are communicated with each other via communication passages, and wherein said intake/discharge tube is designed to have a length such that an open end of said intake/discharge tube is capable of being arranged outside an environment in which water exists, when said cylinder apparatus is installed in said environment in which water exists.

2. The cylinder apparatus according to claim 1, wherein said communication passages are communicated with each other via a communication chamber which is formed between said communication passages and which is formed in said cylinder tube.

3. The cylinder apparatus according to claim 2, wherein said holes are arranged opposingly to said communication passages.

4. The cylinder apparatus according to claim 1, wherein a dust-removing mechanism is provided at said open end of said intake/discharge tube.

5. The cylinder apparatus according to claim 4, wherein said dust-removing mechanism is composed of a filter having a mesh-shaped form.

6. The cylinder apparatus according to claim 1, wherein one of said holes is connected to said intake/discharge tube, and the other hole is closed by a closing member.

7. The cylinder apparatus according to claim 1, wherein said intake/discharge tube is connected to said hole by the aid of a joint member, and a disengagement-preventive section for preventing said intake/discharge tube from being disengaged is provided at a portion of said joint member to which said intake/discharge tube is installed.

8. The cylinder apparatus according to claim 1, wherein said guide rod is connected integrally by the aid of a connecting member.

9. The cylinder apparatus according to claim 1, wherein a buffer member, which buffers impact at a displacement terminal end position of said piston, is provided between said piston and said cylinder tube.

10. A cylinder apparatus comprising:

a guide mechanism for guiding displacement in an axial direction of a piston provided in a cylinder tube, said guide mechanism including a guide hole formed in said cylinder tube, and a guide rod provided insertably into said guide hole to make displacement integrally with said piston;

a pair of holes which makes communication between said guide hole and outside of said cylinder tube and which discharges air from inside of said guide hole or which sucks said air from said outside of said cylinder tube into said guide hole in accordance with forward and backward movement of said guide rod; and an intake/discharge tube which is connected to said hole and through which said air flows to be sucked into or discharged from said guide hole via said hole, wherein one of said holes is connected to said intake/discharge tube, and the other hole is closed by a closing member, and wherein said intake/discharge tube is designed to have a length such that an open end of said intake/discharge tube is capable of being arranged outside an environment in which water exists, when said cylinder apparatus is installed in said environment in which water exists.

11. The cylinder apparatus according to claim 10, wherein a pair of said guide holes is provided substantially in parallel to a cylinder chamber in which said piston is arranged, said cylinder chamber being positioned at the center between said guide holes, and one guide hole and the other guide hole are communicated with each other via communication passages.

12. The cylinder apparatus according to claim 11, wherein said communication passages are communicated with each other via a communication chamber which is formed between said communication passages and which is formed in said cylinder tube.

13. The cylinder apparatus according to claim 12, wherein said holes are arranged opposingly to said communication passages.

14. The cylinder apparatus according to claim 10, wherein a dust-removing mechanism is provided at said open end of said intake/discharge tube.

15. The cylinder apparatus according to claim 14, wherein said dust-removing mechanism is composed of a filter having a mesh-shaped form.

16. The cylinder apparatus according to claim 10, wherein said intake/discharge tube is connected to said hole by the aid of a joint member, and a disengagement-preventive section for preventing said intake/discharge tube from being disengaged is provided at a portion of said joint member to which said intake/discharge tube is installed.

17. The cylinder apparatus according to claim 10, wherein said guide rod is connected integrally by the aid of a connecting member.

18. The cylinder apparatus according to claim 10, wherein a buffer member, which buffers impact at a displacement terminal end position of said piston, is provided between said piston and said cylinder tube.

19. A cylinder apparatus comprising:

a guide mechanism for guiding displacement in an axial direction of a piston provided in a cylinder tube, said guide mechanism including a guide hole formed in said cylinder tube, and a guide rod provided insertably into said guide hole to make displacement integrally with said piston;

a pair of holes which makes communication between said guide hole and outside of said cylinder tube and which discharges air from inside of said guide hole or which sucks said air from said outside of said cylinder tube into said guide hole in accordance with forward and backward movement of said guide rod; and an intake/discharge tube which is connected to said hole and through which said air flows to be sucked into or discharged from said guide hole via said hole, wherein said intake/discharge tube is connected to said hole by the aid of a joint member, and a disengagement-preventive section for preventing said intake/discharge tube from being disengaged is provided at a portion of said joint member to which said intake/discharge tube is installed, and wherein said intake/discharge tube is designed to have a length such that an open end of said intake/discharge tube is capable of being arranged outside an environment in which water exists, when said cylinder apparatus is installed in said environment in which water exists.

20. The cylinder apparatus according to claim 19, wherein a pair of said guide holes is provided substantially in parallel to a cylinder chamber in which said piston is arranged, said cylinder chamber being positioned at the center between said guide holes, and one guide hole and the other guide hole are communicated with each other via communication passages.

21. The cylinder apparatus according to claim 20, wherein said communication passages are communicated with each other via a communication chamber which is formed between said communication passages and which is formed in said cylinder tube.

22. The cylinder apparatus according to claim 21, wherein said holes are arranged opposingly to said communication passages.

23. The cylinder apparatus according to claim 19, wherein a dust-removing mechanism is provided at said open end of said intake/discharge tube.

24. The cylinder apparatus according to claim 23, wherein said dust-removing mechanism is composed of a filter having a mesh-shaped form.

25. The cylinder apparatus according to claim 19, wherein one of said holes is connected to said intake/discharge tube, and the other hole is closed by a closing member.

26. The cylinder apparatus according to claim 19, wherein said guide rod is connected integrally by the aid of a connecting member.

27. The cylinder apparatus according to claim 19, wherein a buffer member, which buffers impact at a displacement terminal end position of said piston, is provided between said piston and said cylinder tube.

28. A cylinder apparatus comprising:

a guide mechanism for guiding displacement in an axial direction of a piston provided in a cylinder tube, said guide mechanism including a guide hole formed in said cylinder tube, and a guide rod provided insertably into said guide hole to make displacement integrally with said piston;

a pair of holes which makes communication between said guide hole and outside of said cylinder tube and which discharges air from inside of said guide hole or which sucks said air from said outside of said cylinder tube into said guide hole in accordance with forward and backward movement of said guide rod; and an intake/discharge tube which is connected to said hole and through which said air flows to be sucked into or discharged from said guide hole via said hole, wherein said guide rod is connected integrally by the aid of a connecting member, and wherein said intake/discharge tube is designed to have a length such that an open end of said intake/discharge tube is capable of being arranged outside an environment in which water exists, when said cylinder apparatus is installed in said environment in which water exists.

29. The cylinder apparatus according to claim 28, wherein a pair of said guide holes is provided substantially in parallel to a cylinder chamber in which said piston is arranged, said cylinder chamber being positioned at the center between said guide holes, and one guide hole and the other guide hole are communicated with each other via communication passages.

30. The cylinder apparatus according to claim 29, wherein said communication passages are communicated with each other via a communication chamber which is formed between said communication passages and which is formed in said cylinder tube.

31. The cylinder apparatus according to claim 30, wherein said holes are arranged opposingly to said communication passages.

32. The cylinder apparatus according to claim 28, wherein a dust-removing mechanism is provided at said open end of said intake/discharge tube.

33. The cylinder apparatus according to claim 32, wherein said dust-removing mechanism is composed of a filter having a mesh-shaped form.

34. The cylinder apparatus according to claim 28, wherein one of said holes is connected to said intake/discharge tube, and the other hole is closed by a closing member.

35. The cylinder apparatus according to claim 28, wherein said intake/discharge tube is connected to said hole by the aid of a joint member, and a disengagement-preventive section for preventing said intake/discharge tube from being disengaged is provided at a portion of said joint member to which said intake/discharge tube is installed.

36. The cylinder apparatus according to claim 28, wherein a buffer member, which buffers impact at a displacement terminal end position of said piston, is provided between said piston and said cylinder tube.

37. A cylinder apparatus comprising:

a guide mechanism for guiding displacement in an axial direction of a piston provided in a cylinder tube, said guide mechanism including a guide hole formed in said cylinder tube, and a guide rod provided insertably into said guide hole to make displacement integrally with said piston;

a pair of holes which makes communication between said guide hole and outside of said cylinder tube and which discharges air from inside of said guide hole or which sucks said air from said outside of said cylinder tube into said guide hole in accordance with forward and backward movement of said guide rod; and an intake/discharge tube which is connected to said hole and through which said air flows to be sucked into or discharged from said guide hole via said hole, wherein a buffer member, which buffers impact at a displacement terminal end position of said piston, is provided between said piston and said cylinder tube, and wherein said intake/discharge tube is designed to have a length such that an open end of said intake/discharge tube is capable of being arranged outside an environment in which water exists, when said cylinder apparatus is installed in said environment in which water exists.

38. The cylinder apparatus according to claim 37, wherein a pair of said guide holes is provided substantially in parallel to a cylinder chamber in which said piston is arranged, said cylinder chamber being positioned at the center between said guide holes, and one guide hole and the other guide hole are communicated with each other via communication passages.

39. The cylinder apparatus according to claim 38, wherein said communication passages are communicated with each other via a communication chamber which is formed between said communication passages and which is formed in said cylinder tube.

40. The cylinder apparatus according to claim 39, wherein said holes are arranged opposingly to said communication passages.

41. The cylinder apparatus according to claim 37, wherein a dust-removing mechanism is provided at said open end of said intake/discharge tube.

42. The cylinder apparatus according to claim 41, wherein said dust-removing mechanism is composed of a filter having a mesh-shaped form.

43. The cylinder apparatus according to claim 37, wherein one of said holes is connected to said intake/discharge tube, and the other hole is closed by a closing member.

44. The cylinder apparatus according to claim 37, wherein said intake/discharge tube is connected to said hole by the aid of a joint member, and a disengagement-preventive section for preventing said intake/discharge tube from being disengaged is provided at a portion of said joint member to which said intake/discharge tube is installed.

45. The cylinder apparatus according to claim 37, wherein said guide rod is connected integrally by the aid of a connecting member.

* * * * *